United States Patent [19]

Seymour

[11] 4,343,137
[45] Aug. 10, 1982

[54] CROP ELEVATOR DECELERATING MEANS

[75] Inventor: Shaun A. Seymour, New Holland, Pa.

[73] Assignee: Sperry Corporation, New Holland, Pa.

[21] Appl. No.: 181,331

[22] Filed: Aug. 25, 1980

[51] Int. Cl.³ .............................................. A01D 75/18
[52] U.S. Cl. ................................... 56/10.2; 130/27 JT
[58] Field of Search ............... 56/10.2, DIG. 15, 11.7; 130/27 R, 27 AB, 27 JT

[56] References Cited

U.S. PATENT DOCUMENTS

| | | | |
|---|---|---|---|
| 3,576,188 | 4/1971 | Tanis | 130/27 JT |
| 3,643,666 | 2/1972 | Denison | 130/27 JT |
| 3,675,660 | 7/1972 | Girodat | 130/27 JT |
| 3,756,248 | 9/1973 | Mathews | 130/27 JT |
| 3,805,798 | 4/1974 | Girodat | 130/27 JT |
| 3,971,390 | 7/1976 | McDuffie | 130/27 JT |
| 3,990,218 | 11/1976 | Graeber | 56/10.2 |
| 4,146,038 | 3/1979 | DeBusscher | 130/27 JT |
| 4,261,161 | 4/1981 | Colgrove | 56/10.2 |

*Primary Examiner*—Jay N. Eskovitz
*Attorney, Agent, or Firm*—Larry W. Miller; Frank A. Seemar

[57] ABSTRACT

In a harvesting and threshing machine having stone sensing apparatus mounted within an infeed housing, the infeed housing being mounted to the machine and effective to receive crop material from a header and convey the crop material via a crop elevator from the header to threshing and separating apparatus within the machine, there is provided control apparatus connectable to the stone sensing apparatus effective upon activation of the stone sensing apparatus to stop the crop elevator from conveying crop material from the header to the threshing and separating apparatus.

28 Claims, 5 Drawing Figures

CROP ELEVATOR DECELERATING MEANS

BACKGROUND OF THE INVENTION

This invention relates generally to crop harvesting and threshing machines, more commonly known as combines, and more particularly to the infeed housing attached to the front of the base unit of the combine which is used to transfer the crop material from the harvesting attachment or header upwards into the base unit where the threshing operation occurs. Specifically, the invention is concerned with control apparatus which responds to an input signal from the stone detecting apparatus by sending an output signal to an actuator cooperable with the drive unit for the crop elevator within the infeed housing to disengage the drive to the crop elevator while permitting the considerable inertial force within the elevator to dissipate itself.

In the prior conventional types of combines using a transverse threshing cylinder, stone traps were routinely provided to separate out large hard objects or stones that generally were greater than three or four inches in size. The stone traps provided in the conventional combines were utilized generally in two types of stone ejecting systems.

The passive type of stone ejecting system employed a stone trap with a space or gap between the top of the crop elevator or conveyor within the infeed housing and the base unit threshing apparatus. In this type of an ejecting system hard objects or stones were conveyed upwardly along with the crop material from the header through the infeed housing towards the threshing apparatus. When the crop material passed over the gap, stones by their very weight would fall down through the gap into the stone trap. Those stones that were carried along with the crop material past the stone trap were passed into contact with the threshing cylinder, which generally was rotatably mounted transversely to the longitudinal axis of the combine. If the hard objects or stones were of sufficient size so that they would not easily pass between the threshing cylinder and the threshing concaves, they would be thrown backwardly by the rotation of the cylinder into the gap or space. Thus, this particular cooperation between the threshing cylinder and the stone trap created an almost natural stone ejecting system for conventional combines. Even if a stone did pass into the threshing cylinder it made only one pass about the cylinder and across the underlying concave, usually doing minimal damage to the threshing apparatus before it was passed on through and ejected from the combine.

The second type of stone ejecting system generally employed an active system which utilized some sort of an electronic sensor, such as an acoustic transducer typically in the form of a piezoelectric disc mounted in a sensing plate, in conjunction with a stone trap. The electronic sensor responded to the characteristics of the sound, such as the amplitude and frequency, that an impacting stone generated in the sensing plate. This signal would then be transferred through an electronic circuit that filtered out the range within which the amplitude and frequency was characteristic of stones. Within this characteristic spectral range the electronic circuit automatically activated a latch releasing mechanism on a door along the bottom of the infeed housing that would pivot open to permit the stones or hard objects to be ejected from the feeder house, along with a small amount of crop material.

This latter or active type of sensing system utilizing a latched trap door that was automatically opened upon impact of a stone or stone-like object against the sensing plate was an appreciable step forward in stone detecting and ejecting technology. However, because the stone or stone-like objects were generally passed along the predetermined path with the crop material, quite frequently when the stone trap door was opened the stone or hard-objects continued to move along with the crop material and passed over the opening created by the lowered trap door. Frequently, the detected stones would still pass upwardly from the infeed housing into the threshing apparatus, where it would pass with the crop material about the threshing concave and the threshing cylinder. Again, because it was only a single pass of crop material about a portion of the conventional transverse threshing cylinder and across a relatively narrow strip of concave, detected but unejected stones still caused minimal damage to the combine.

An alternate type of active stone ejecting system utilized a pinch roll rotatably mounted in the infeed housing at a predetermined distance above the trap door. When a stone of sufficient size was carried by the crop elevator between the pinch roll and the trap door into compressive engagement therewith, the rotation of the pinch roll exerted a downward force through the stone against the trap door. The trap door was spring loaded closed so that above a predetermined pressure the door would be forced open, thereby causing the stone to be directed downwardly and out of the infeed housing through the opening created by the opened trap door. An obvious drawback to this system was the fact that large, but relatively flat stones or stone-like objects capable of passing between the pinch roll and the trap door were ingested into the combine where they could still damage the operating components.

The advent of rotary or axial flow type of combines with single or multiple threshing and separating rotors utilized in an orientation where the longitudinal axis of each rotor is either parallel or transverse to the longitudinal axis of the combine presented a greater need for more effective stone eliminating or ejecting systems. This increased need stems from two principal facts. Axial flow combines generally do not have a transverse threshing cylinder at the top of the infeed housing to throw or direct stones or other damage inducing objects back into the stone trap. They also pass the crop material about the periphery of each rotor as many as five or six times during threshing and separation as the crop material progresses axially along the length of each rotor.

An improved electronic stone or stone-like object detecting system was developed, as shown and described in copending U.S. patent application Ser. No. 109,932, filed Jan. 4, 1980 and assigned to the assignee of the present invention, utilizing a sensing plate that is positioned transversely across the bottom of the infeed housing astride the path of crop flow from the header to the base unit of the combine. In this type of a system the reaction time for the opening of the trap door is relatively short and, because the crop material in an axial flow combine makes multiple passes about the rotor as it is transferred along the length of the concave during the threshing and separating cycle, elimination of detected stones and stone-like objects becomes more critical. A stone or stone-like non-frangible object passing through an axial flow type of combine is more apt to damage the entire length of the concaves, which with their rasp or rub bars cooperate with the rotors to thresh the crop material. In marked contrast, a stone passing through a conveying crop material from the header to the threshing and separating apparatus while permitting the considerable inertial movement in at least the crop elevator to dissipate itself without damaging the drive system thereto.

SUMMARY OF THE INVENTION

It is a principal object of the present invention to provide in an infeed housing for a combine a control apparatus that cooperates with stone sensing or detecting apparatus to disconnect the drive to the crop elevator within the infeed housing upon detection of a stone or stone-like object by the stone detecting apparatus.

It is another object of the present invention to provide in an infeed housing for a combine the capability to disconnect the drive to the crop elevator upon detection of a stone or stone-like object and permit the inertial movement of the crop conventional type of combine with a transversely oriented threshing cylinder and underlying concave contacts only a very small portion of the concave and is therefore likely to cause relatively little damage in its single pass about a portion of the cylinder. Thus, in an improved detecting system such as that shown and described in the aforementioned co-pending patent application, use on an axial flow type of combine necessitates a much higher percentage of stone ejection or a system which effectively interrupts the infeed of crop material through the infeed housing to the threshing and separating rotors. Any improved ejecting or feed interrupting system operating within this new detection system must be fast acting since the crop material has been determined to move at an approximate rate of fifteen feet per second through a typical infeed housing and the typical reaction time from time of detection of a stone or stone-like object to ejection is 0.2 of a second.

The earlier mentioned active type of stone sensing system utilizing an electronic sensor had developed a system utilizing an electromagnetic clutch to disconnect the drive to the crop elevator within the infeed housing upon the sensing of a stone. However, this system totally ignored the aspect of the inertial load to which the drive components were subjected from the rotating crop elevator and header was after the drive to the crop elevator disconnected. If a complete and instantaneous shutdown is attempted, the inertia from the rotating components will damage the drive system. On the other hand, if no instantaneous shutdown provision exists, the rundown time for the crop elevator will be so long that the crop material with the detected stone or stone-like object could be carried past the stone trap door and up into the threshing and separating apparatus of the combine. Then the damage to the threshing and separating apparatus sought to be avoided by the stone detecting apparataus would still result.

The foregoing problems are solved in the design of the present invention by providing control apparatus in a harvesting and threshing machine having stone sensing apparatus with an infeed housing mounted to the machine effective to receive crop material from a header and convey it via a crop elevator to the threshing and separating apparatus within the machine, the control apparatus being effective upon actuation of the stone sensing apparatus to stop the crop elevator from elevator to run down or dissipate itself without damaging the drive components of the infeed housing.

It is a further object of the present invention to provide control apparatus in the infeed housing of a combine which cooperates with the drive to the elevator so that upon detection of a stone or stone-like object by the stone detecting apparatus the control apparatus will prevent the detected object from entering the combine's threshing and separating apparatus, thereby avoiding damaging the combine.

It is a feature of the present invention that the control apparatus cooperates with the stone detecting apparatus which senses the presence of a stone or stone-like object and sends an output signal to the control apparatus to thereby cause the drive to the crop elevator of the infeed housing to be disengaged.

It is a further feature of this invention that an electric clutch may be used to disconnect the drive to the main drive shaft to actively cease driving the crop elevator.

It is another feature of the present invention that an overrunning mechanism in the form of a rattle clutch is utilized to allow the rotating components of the crop elevator and the header to dissipate their inertial movement after the driving connection to each has been disengaged.

It is an advantage of the present invention that stones or stone-like objects upon their detection are positively prevented from entering the threshing and separating apparatus of the combine.

It is another advantage of the present invention that the rotation of the drive components of the crop elevator are stopped in a very short period of time after the detection of a stone or stone-like object in the mat of crop material being transferred through the infeed housing.

It is a further advantage of the present invention that an overrun mechanism is utilized to permit the rundown of the infeed housing crop elevator, thereby compensating for the inertia of the rotating components within the infeed housing and the header without damaging the drive systems for the header and the crop elevator.

These and other objects, features and advantages are obtained by providing in a crop harvesting and threshing machine a control apparatus connectable to both a stone sensing or detecting apparatus and a crop elevator within the infeed housing which conveys crop material from a header to the threshing and separating apparatus, the control apparatus being effective upon activation of the stone sensing apparatus to stop the crop elevator from conveying crop material from the header to the threshing and separating apparatus.

BRIEF DESCRIPTION OF THE DRAWINGS

The features and advantages of this invention will become apparent upon consideration of the following detailed disclosure of the invention, especially when it is taken in conjunction with the accompanying drawings wherein.

DETAILED DESCRIPTION OF THE PREFERRED EMBODIMENT

Figure 5:
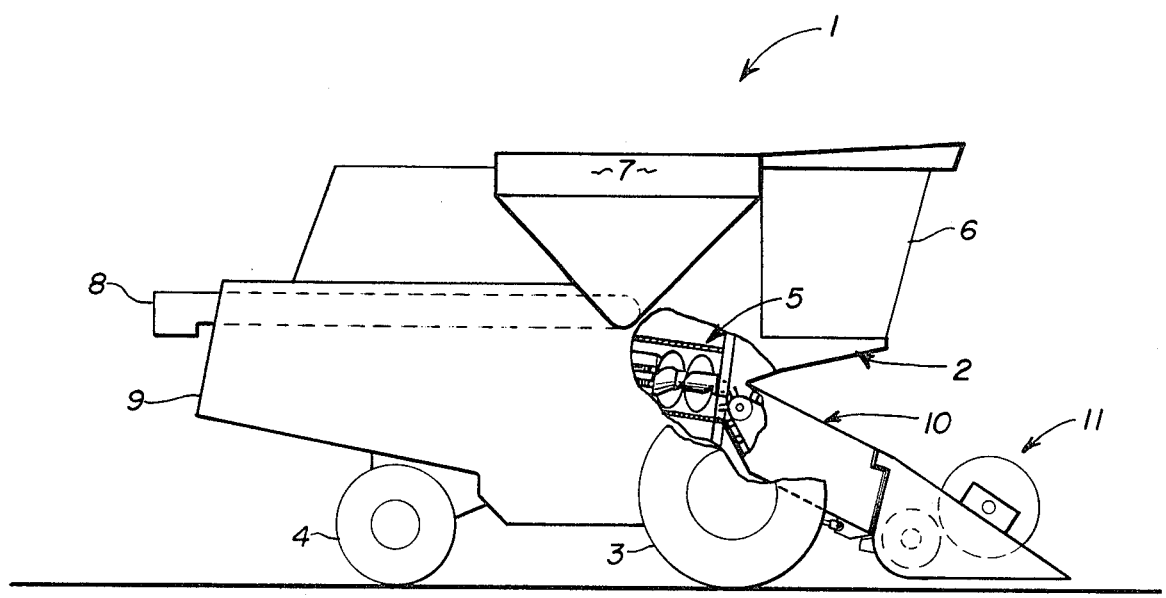
FIG. 5 is a side elevational view of a combine showing the relative positioning of the infeed housing with respect to the threshing and separating apparatus.

FIG. 5 shows a combine 1 in side elevational view with portions cut away to show the threshing and separating apparatus 5 and a portion of the infeed housing 10. As can be seen, the combine 1 has a mobile frame, indicated generally by the numeral 2, supported by a pair of primary driving wheels 3 in the front and a smaller pair of steerable wheels 4 in the rear. The combine 1 is powered by an engine (not shown) of relatively high horsepower and usually diesel fuel consuming. The infeed housing 10 is mounted to the forward portion of the combine frame and has attached thereto a header 11. Overlying the infeed housing 10 and a portion of the header 11 is a cab 6. Rearwardly of the cab 6 and centrally positioned atop the combine 1 is a grain tank 7. Crop material is cut and gathered by the header 11, passed through the infeed housing 10 into the threshing and separating apparatus 5 where it is processed. Cleaning apparatus next separates the grain from the chaff, the chaff being discharged from the unit. The cleaned grain is then transferred for storage via conventional grain transfer apparatus to the grain tank 7. The grain is unloaded from the grain tank 7 utilizing an unloading auger 8. Housing 9 covers the grain cleaning apparatus and chaff discharge apparatus, both of which are not shown.

Figure 1:
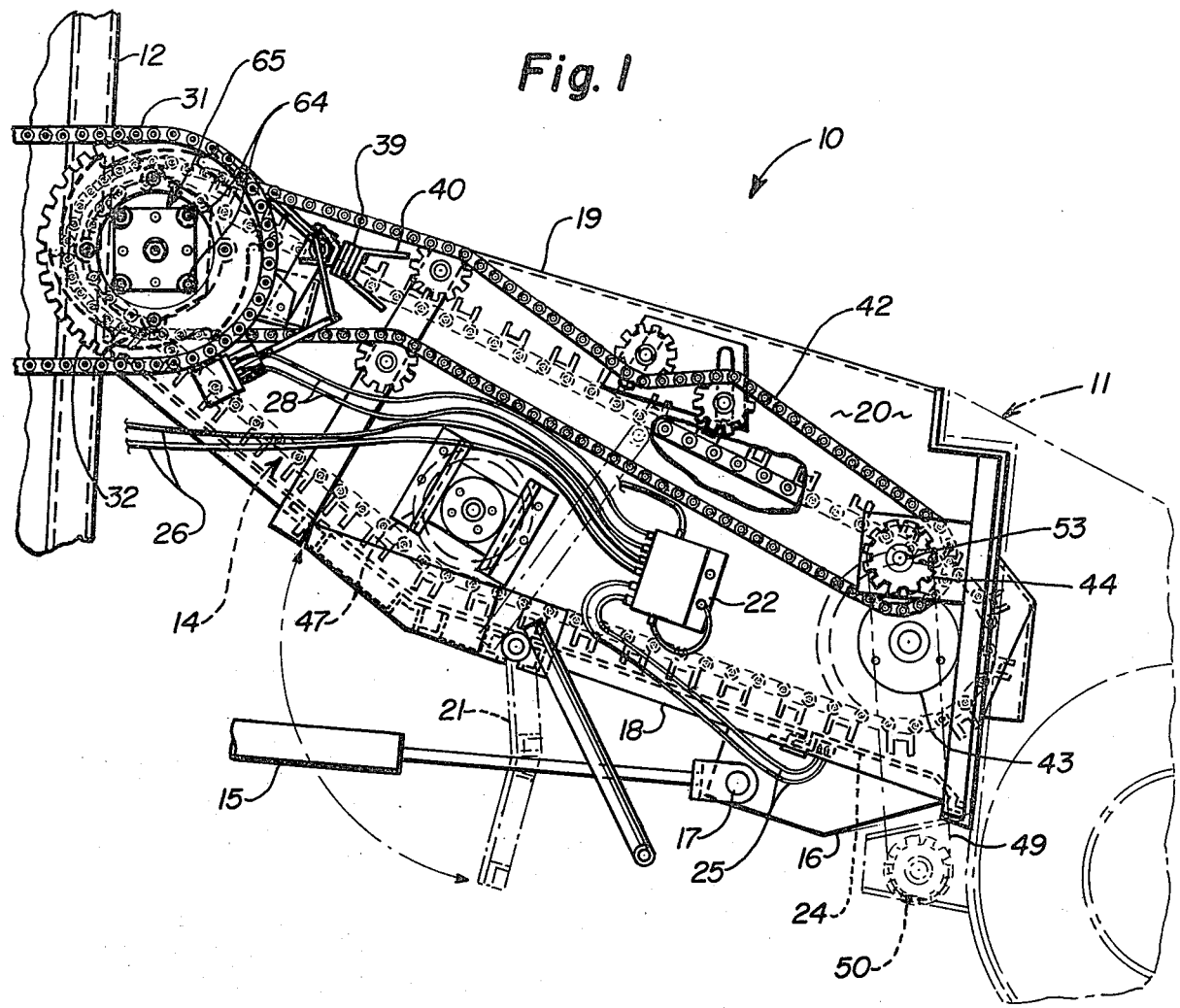
FIG. 1 is a side elevational view of the infeed housing of the combine showing the control apparatus of the present invention, the drive apparatus and the stone detector with which the control apparatus cooperates.

Now, referring to FIG. 1 there is shown the infeed housing 10 which is attachable to the front portion of the main frame 2 of the combine 1 of FIG. 5 in side elevational view showing the critical drive elements and control apparatus of the instant invention. The front portion of the infeed housing 10 is suitably fastened to a header 11, only part of which is shown, which may be one of several types which gather crop material from the field, generally consolidate the crop material and transfer it upwardly and rearwardly into the infeed housing 10. The rear portion of the infeed housing 10 is suitably fastened to the front portion 12 of the frame 2, only partially shown in FIG. 1. The crop elevator, indicated generally by the numeral 14, is rotatably mounted within the sidewalls of the infeed housing 10 and serves to convey crop material upwardly from the header 11 into the threshing and separating apparatus or rotors 5 of FIG. 5.

The infeed housing 10 with its attached header 11 is pivotably raised and lowered about its attachment point (not shown) to the frame 2 by a pair of hydraulic cylinders 15, only one of which is shown in FIG. 1. The hydraulic cylinder 15 is appropriately anchored on one end to the main frame 2 of the combine (also not shown) and on the other is movably attached to the infeed housing at mounting plate 16 via a locking pin 17.

Figure 2:
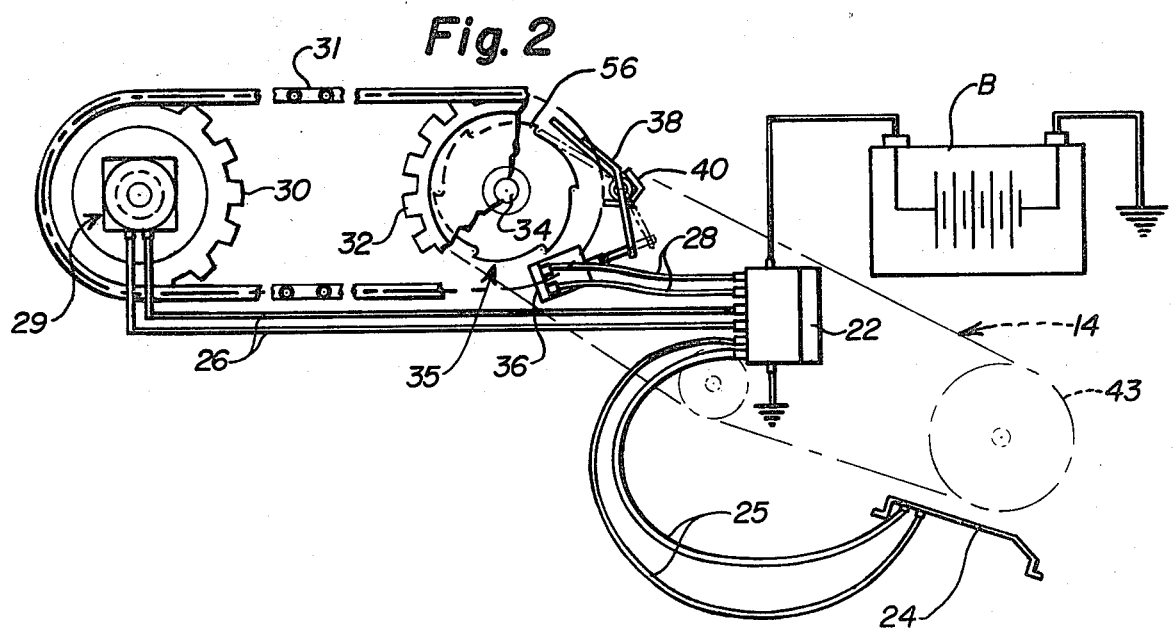
FIG. 2 is a diagrammatical illustration of the circuitry of the control apparatus and the electric clutch and the solenoid which are used to disengage the drive to the crop elevator in the infeed housing.

The infeed housing 10 of FIG. 1 also has a floor portion 18 along with crop material is conveyed by the aforementioned crop elevator 14. The top or covering 19 of the infeed housing 10 and the floor portion 18 are connected by opposing sidewalls 20, only one of which are shown. A downwardly pivoting door 21 is releasably held in place along the floor portion by an appropriate latching mechanism (not shown) which is controlled by the electronic circuitry in a control box 22 that is fastened to one of the sidewalls of the infeed housing 10. A stone sensing plate 24 is mounted to the very forward portion of the infeed housing at the front edge of the floor 18 in a manner which acoustically isolates or dampens it from the vibrational noises of the infeed housing 10 and its moving components. When a stone or stone-like object impacts against plate 24 a signal is sent via connecting wires 25 to the control box 22. Upon receipt of a signal within the predetermined range that is characteristic of stones or stone-like objects by the circuitry within the control box 22, described in greater detail in the previously mentioned copending U.S. application Ser. No. 109,932, filed Jan. 4, 1980, a signal is sent via connecting wires 26 and 28 to other elements of the drive apparatus (see briefly FIG. 2). Connecting wires 26 run from the control box 22 and the control apparatus therein to an electric clutch in the preferred embodiment, indicated generally by the numeral 29. The electric clutch 29 controls the drive to the driving sprocket 30, which receives rotary power from the engine of the combine. Driving sprocket 30 is connected by an appropriately sized drive chain 31 to driven sprocket 32. Sprocket 32 is mounted about a rotating shaft 34 and is cooperative with the rattle clutch indicated generally by the numeral 35. Solenoid 36 is appropriately mounted to side sheet 20 and controls the movement of latch arm or pawl 38, which is pivotally mounted to the solenoid 36 in a manner that will be described hereafter. A shock absorbing rubber mounting 39 is affixed to the side sheet 20 via angle plate 40 to cushion the movement of the latch arm or pawl 38 as the crop elevator 14 runs down after the drive between sprockets 30 and 32 has been disconnected. As seen in FIG. 2, the electrical power for the electrical components is supplied by battery B.

Figure 3:
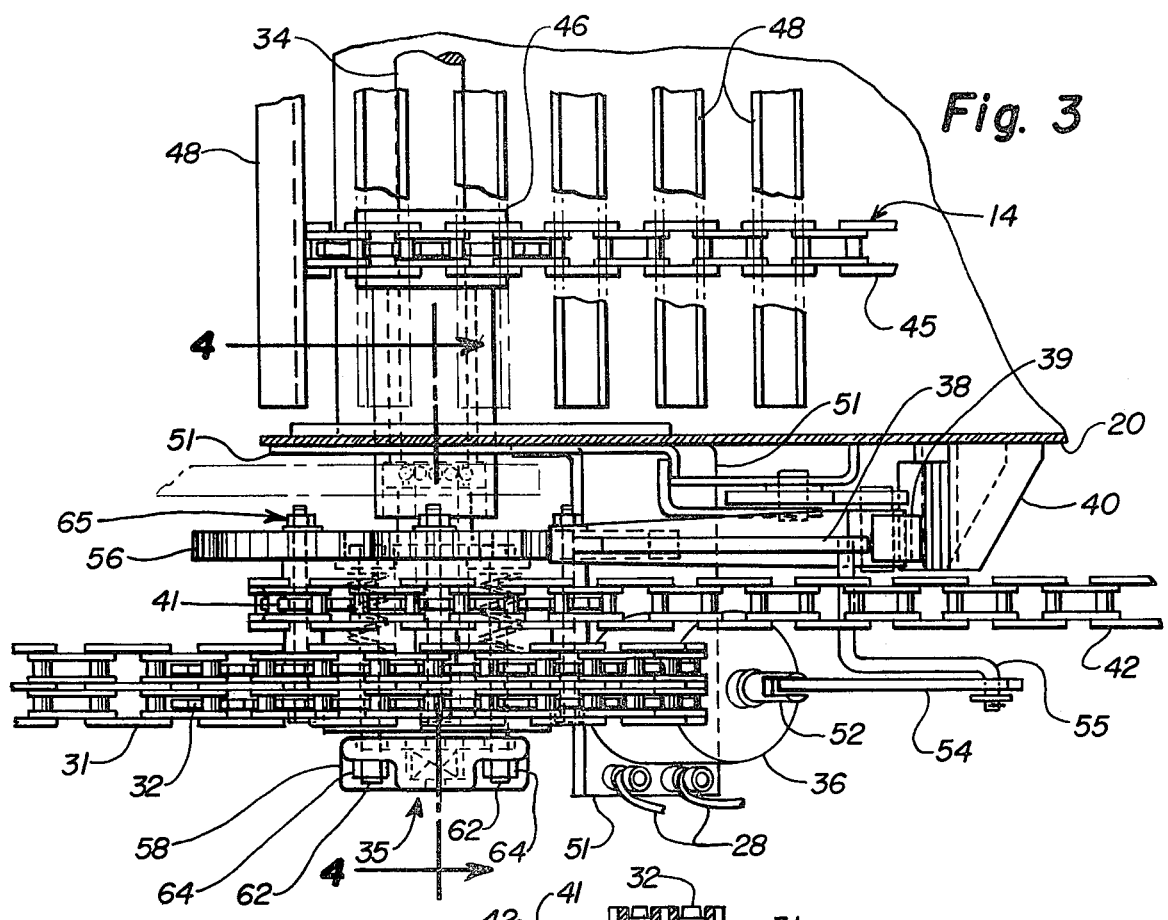
FIG. 3 is a partial top plan view of the crop elevator in the area of the sprocket which is drivingly connected to the crop elevator showing the electrical solenoid which is used to engage the stop pawl with the clutch plate to stop the rotation of the crop elevator after the main drive to the crop elevator has been disengaged.
Figure 4:
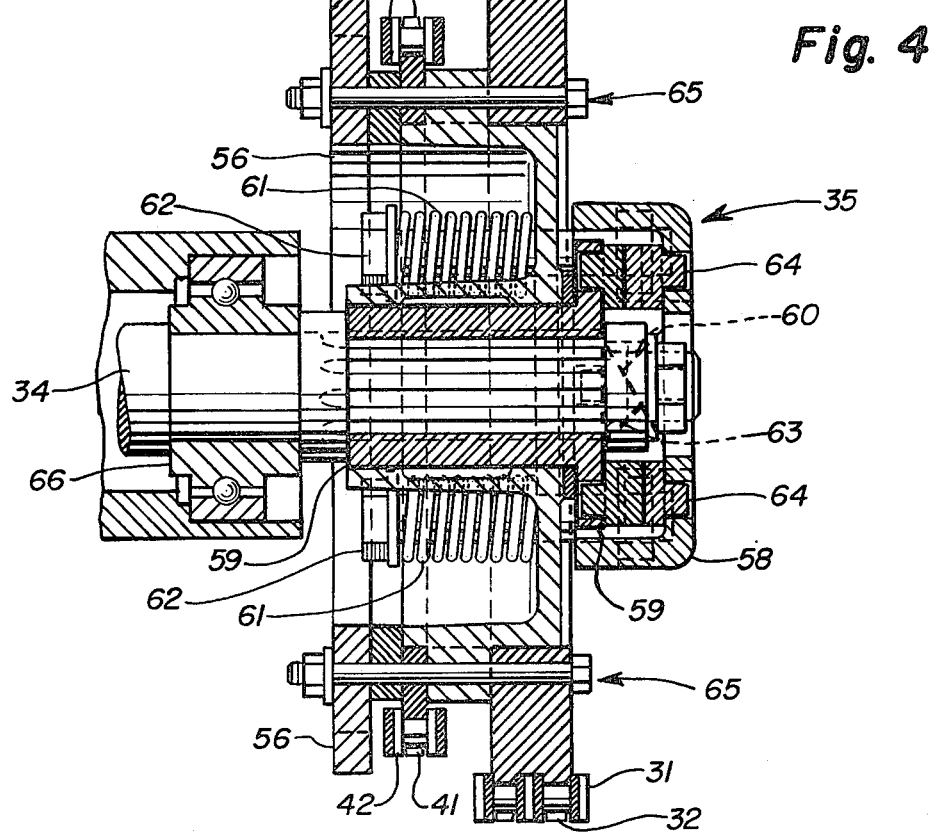
FIG. 4 is a sectional view taken along the line 4—4 of FIG. 3 showing the overrunning rattle clutch that is utilized to permit the inertia in the crop elevator and the header to dissipate itself after the drive to the crop elevator has been disengaged.

The drive to the crop elevator 14 is transferred through drive chain 31 from sprocket 30 to sprocket 32, as best seen in FIGS. 1, 2 and 3. FIGS. 3 and 4 also show that sprocket 32 is mounted about rotating shaft 34. Shaft 34 has an inner sprocket 41 mounted thereabout. A drive chain 42 connects driven sprocket 41 with sprocket 44, best seen in FIG. 1. Drive chain 42 is then tensioned in a conventional manner by a series of idler sprockets adjustably mounted to the side sheet 20.

The drive to the crop elevator 14 is transmitted through the shaft 34 to a plurality of drive chains 45 via a corresponding plurality of small sprockets 46, only one of which is shown in FIG. 3. A series of parallel angle bar slats 48 extend transversely across the width of the infeed housing 10 and are fastened to the chain 45. The slats 48 and the driven chain 45 pass about a front idler drum 43 and a pinch roller 47, best seen in FIG. 1, as the crop elevator 14 is driven. It is the combination of these slats 48 and the chain 45 which serve to convey the crop material upwardly and rearwardly from the header 11 into the combine 1 during operation.

The drive to the header is transferred through the shaft 53 of FIG. 1, about which sprocket 44 is mounted, to a second sprocket (not shown) mounted interiorly to sprocket 44 and about shaft 53. The drive chain 49, illustrated only in phantom lines, passes about this interior sprocket and the header drive sprocket 50, through which the appropriate drive transfer means are effective to drive the moving components on the header.

As best seen in FIG. 3 the solenoid 36 is affixed to the side sheet 20 by a bracket 51. The plunger 52 of the solenoid 36 is appropriately fastened to a connecting link 54. Connecting link 54 is appropriately connected to latching arm or pawl 38 by connecting rod 55. When the solenoid 36 receives a pulse from control box 22 in response to the detection of a stone or stone-like object, latch arm or pawl 38 seats against clutch plate 56 to stop the drive going to the crop elevator 14 (see also FIG. 2). The pawl 38 and connecting link 55 are driven into the shock absorbing rubber mounting 39 by clutch plate 56 as the plate and shaft 34 are shock stopped. Rattle clutch 35 then permits the crop elevator and the header to run down, dissipating the inertial load after the drive to the electric clutch 39 has been simultaneously disengaged by the control box circuitry with the sending of a signal to solenoid 36. The stone trap door 21 also simultaneously is released so that it may fall to the fully opened position shown in phantom lines in FIG. 1.

FIG. 4 shows the rattle clutch 35 in cross sectional detail. An end cap housing 58 and a mating interior housing 59 are seated over shaft 34. Interior housing 59 is seated onto the splinings in shaft 34. Both the end cap housing 58 and the interior housing 59 have angled raised teeth portions of rattles 60 and 63 respectively, which are held against each other by the force of springs 61. Springs 61 are mounted about bolts 62 which pass through inner sprocket 41 and main drive double sprocket 32, into housing 59 and end cap housing 58 of the rattle clutch before they are fastened appropriately by nuts 64 best seen in FIG. 3. Clutch plate 56, inner sprocket 41 and double sprocket 32, appropriately spaced by spacing shims, are bolted together by four bolts, washers and nuts collectively indicated by the numeral 65, two of which are most clearly seen in FIG. 4. Shaft 34 is supported by bearing housing 66 adjacent sidewall 20 of the infeed housing.

In operation the combine 1 is driven across a field of crop material which is harvested by the harvesting attachment or header 11. The header consolidates the crop material via a consolidating auger and transfers the crop material rearwardly and upwardly into the infeed housing 10. The infeed housing 10 has its crop elevator 14 rotatably moving in a generally clockwise direction, as seen in FIG. 1, to engage the crop material with its slats 48 and chains 45 to move the crop material generally rearwardly and upwardly towards the threshing and separating apparatus 5 of the combine 1. As the crop material enters the infeed housing 10 and passes over the sensing plate 24, any stone or stone-like objects must necessarily strike the sensing plate 24 because of the path followed by the crop material.

Upon impact the spectral characteristics of the impacting object are analyzed by the stone detecting circuitry contained within the control box 22. When the object generates a response within the known spectral characteristics of stones and other stone-like objects, the control box 22 sends a signal to solenoid 36 and the electric clutch 29. The signal to the electric clutch 29 disengages the drive to the infeed housing 10 and the crop elevator 14. Since the crop elevator 14 and the header 11 have been in motion, the inertial load on the drive system continues to turn drive chain 42 and the sprockets 41 and 44, about which chain 42 passes. The signal to solenoid 36 extends plunger 52, causing the pawl 38 to engage the clutch plate 56 and stopping the rotational movement of sprockets 41 and 32. However, the inertial load on the crop elevator continues to turn shaft 34. The turning of shaft 34 causes interior housing 59, which is splined to shaft 34, to continue to turn and force the springs 61 to be compressed, thereby allowing the end cap 58 with its rattles 60 to overrun the rattles 63 of interior housing 59. The overrunning action of the end cap rattles 60 and interior housing rattles 63 permits the inertia within the crop elevator 14 to be dissipated in a very short period of time, without damaging any drive components.

It should be noted that this type of a system is equally applicable to both a conventional combine and a combine of the axial flow type. The desirable end results of preventing damage to the threshing and separating apparatus by preventing a stone or stone-like object from reaching such apparatus as well as preventing damage to the drive systems from inertial load can be accomplished by structure similar to that which has been described herein.

While the preferred structure in which the principles of the present invention have been incorporated is shown and described above, it is to be understood that the invention is not to be limited to the particular details thus presented, but, in fact, widely different means may be employed in the practice of the broader aspects of this invention. The scope of the appended claims is intended to encompass all obvious changes in the details, materials and arrangements of parts which will occur to one of ordinary skill in the art upon a reading of this disclosure.

Having thus described the invention what is claimed is:

1. In a harvesting and threshing machine for harvesting crop material from a field with a header attached thereto and apparatus for processing the crop material having:
   (a) a mobile frame;
   (b) power means mounted to the frame to propel the machine across the field and to drive the moving components thereon;
   (c) an infeed housing mounted to the frame and the header and having two opposing sides interconnected by a floor and an opposing top;
   (d) a crop elevator movably mounted within the infeed housing to convey crop material from the header into the machine for processing, said crop elevator including a drive means connectable to the power means to operatively drive the crop elevator;
   (e) stone sensing means connected to the machine to identify the presence of stone-like objects within the crop material being conveyed for processing and effective to send a signal upon such identification;
   (f) drive control means connectable to the crop elevator effective selectively to disconnect the drive to the elevator after identification by the stone sensing means so that the elevator ceases to be actively driven thereby preventing detected stone-like objects from being conveyed to the machine, said drive means including a rotatable shaft with at least a first drive transfer means and a second drive transfer means mounted thereto, the first drive transfer means being connected to the power means and the drive control means and the second drive transfer means being drivingly connected to the first drive transfer means and via the shaft connected to the crop elevator; and (g) controlled overrun means cooperable with the drive control means and the crop elevator for a rapid dissipation of the inertia of the crop elevator when the drive thereto is disconnected so that the movement of the crop elevator is halted before any detected stone-like objects can be conveyed to the crop material processing apparatus without causing damage to the infeed housing or the drive means.

2. The apparatus according to claim 1 wherein the crop elevator is driven by drive means mounted to the infeed housing and connectable to the power means by power transfer means.

3. The harvesting and threshing machine according to claim 2 wherein the drive control means further comprises a solenoid mounted to the infeed housing and cooperable with the drive means.

4. The harvesting and threshing machine according to claim 3 wherein the stone sensing means further comprises a sensing plate mounted to the infeed housing.

5. The harvesting and threshing machine according to claim 4 wherein the sensing plate is further connected to a control means capable of receiving an input signal from the sensing plate when a stone-like object is identified and sending an output signal to the solenoid to stop the drive of the first drive transfer means while permitting the controlled overrun means to allow the crop elevator to run down.

6. The harvesting and threshing machine according to claim 5 wherein the drive control means further includes a first clutch mounted to the machine and connectable via a circuit to the control means, the clutch being energized when the machine is operated across a field so that upon receipt of an input signal identifying a stone-like object by the control means, the circuit is broken and the drive to the crop elevator is disengaged.

7. The harvesting and threshing machine according to claim 6 wherein the drive control means further comprises a second clutch connected to the second drive transfer means and cooperable with the solenoid and the overrun means so that upon receipt of the output signal the solenoid permits the second clutch to be engaged thereby stopping the second drive transfer means and the first drive transfer means while allowing the inertial drive of the crop elevator to run down via the controlled overrun means.

8. The harvesting and threshing machine according to claim 7 wherein the second drive transfer means also drives the header.

9. The harvesting and threshing machine according to claim 8 wherein the first drive transfer means comprises a first sprocket and the second drive transfer means comprises a second sprocket.

10. The harvesting and threshing machine according to claim 9 wherein the power transfer means comprises at least one chain rotatably mounted about the first sprocket and at least a second chain about the second sprocket.

11. The harvesting and threshing machine according to claim 10 wherein the controlled overrun means further comprises a rattle clutch having a first portion and a second portion mounted about the shaft and connectable thereto with the first portion being splined to the shaft, the rattle clutch further being connected to the first and second sprockets so that the first portion will turn with the shaft as the first portion overruns the second portion until the inertia in the crop elevator is run down.

12. In an infeed housing adapted to be mounted to a harvesting and threshing machine with power means for driving the operational components thereof, the combination comprising:

(a) a rigid frame with an inlet end and an opposing outlet end, the frame having a first side and an opposing second side connected by a floor and a top covering;

(b) a crop elevator movably mounted to the opposing sides within the frame and connectable to the power means via a drive means for operatively driving the crop elevator to be effective to convey crop material from the inlet end to the outlet end;

(c) stone sensing means connectable to the infeed housing frame adjacent said inlet end, said stone sensing means being effective to detect the presence of stone-like objects within the crop material entering said inlet end;

(d) drive control means cooperative with the stone sensing means and connectable to the crop elevator drive so as to be effective in response to a detection by the stone sensing means to operatively disconnect the drive between the power means and the crop elevator to prevent the power means from operatively driving the crop elevator and conveying stone-like objects in the crop material from the inlet end to the outlet end, said crop elevator drive means including a rotatable shaft with at least a first sprocket and a second sprocket mounted thereto, the first sprocket being connected to the power means and the drive control means and the second sprocket being drivingly connected to the first sprocket and via the shaft to the crop elevator; and (e) controlled overrun means cooperable with the drive control means and the crop elevator drive so that when the drive is disconnected the inertial drive of the crop elevator is arrested before the stone-like objects are conveyed to the outlet end and without causing damage to the infeed housing.

13. The infeed housing according to claim 12 wherein the controlled overrun means further comprises a rattle clutch having a driven portion connected with the crop elevator to be rotatably moving in unison with the movement of the elevator in conveying crop material through the infeed housing and a drive portion connectable to the drive means so as to be movable therewith, the drive portion being shock stopped when the drive control means disconnects the drive to the crop elevator, the driven portion being biased into driving engagement with the drive portion by a torque limiting mechanism such that when the drive portion is shock stopped the torque limiting mechanism permits the driven portion to rotate with the inertial movement of the crop elevator in sliding engagement with the drive portion, the driven portion overrunning the drive portion until the inertial drive of the crop elevator is run down.

14. The infeed housing according to claim 12 or 13 wherein the drive means is mounted to the infeed housing connectable to the power means by power transfer means.

15. The infeed housing according to claim 14 wherein the drive control means further comprises the solenoid mounted to the infeed housing cooperative with the drive means to move the drive means between a first driving position and a second non-driving position.

16. The infeed housing according to claim 15 wherein the stone sensing means further comprises a sensing plate mounted to the infeed housing.

17. The infeed housing according to claim 16 wherein the sensing plate is further connected to a control means capable of receiving an input signal from the sensing plate when a stone-like object is detected sending an output signal to the solenoid to disengage the drive to the first sprocket.

18. The infeed housing according to claim 17 wherein the drive control means further comprises a first clutch mounted to the machine and connectable via a circuit to the control means, the clutch being energized when the machine is operated to drive the first sprocket but upon receipt of an input signal detecting a stone-like object by the control means, the circuit is broken and the drive to the first sprocket and the crop elevator is disengaged.

19. The infeed housing according to claim 18 wherein the drive control means further comprises a second clutch connected to the second sprocket so that upon receipt of the output signal the solenoid permits the second clutch to be engaged thereby stopping the second sprocket while allowing the inertial drive of the crop elevator to run down.

20. The infeed housing according to claim 19 wherein the second sprocket is also drivingly connected to the header.

21. In a harvesting and threshing machine having a stone sensing means mounted within an infeed housing for detecting stone-like objects, the infeed housing being mounted to the machine and effective to receive crop material from a header and convey the crop material via conveying means from the header to threshing the separating apparatus within the machine, control means connectable to the stone sensing means effective upon activation of the stone sensing means to shock stop the drive to the conveying means to thereby interrupt the conveying of crop material from the header to the threshing and separating apparatus, the improvement comprising:

a rattle clutch cooperatively associated with both the conveying means and the control means and effective upon the stopping of the drive to the conveying means to permit the conveying means to rapidly dissipate its inertial energy through a conversion thereof to dispersible heat energy by the rattle clutch without damaging the infeed housing to arrest the movement of the conveying means before a stone-like object is conveyed into the threshing and separating apparatus, said rattle clutch including a first portion and a second portion, the first portion being connected to the conveying means and the second portion being connected to the drive to the conveying means so that the second portion is shock stopped when the drive is shock stopped by the control means, the first portion being biased into engagement with the second portion by a torque limiting spring mechanism such that the first portion will move with the conveying means as the torque limiting spring mechanism permits the first portion to overrun the second portion until the inertial drive of the conveying means is dissipated due to the conversion of the inertial energy to dispersible heat energy when the first portion slidingly overruns the second portion.

22. The harvesting and threshing machine according to claim 21 wherein the conveying means is driven by drive means mounted to the infeed housing and movable between a first driving position and a second non-driving position.

23. The harvesting and threshing machine according to claim 22 wherein the drive means further comprises a solenoid connectable thereto and cooperative therewith to move the drive means between the first driving position and the second non-driving position.

24. The harvesting and threshing machine according to claim 23 wherein the stone sensing means further comprises a sensing plate mounted to the infeed housing and connectable to the control means.

25. The harvesting and threshing machine according to claim 24 wherein the control means further receives an input signal from the sensing plate when a stone-like object is identified and sends an output signal to the solenoid to effect the positioning of the drive means in the first non-driving position.

26. The harvesting and threshing machine according to claim 25 wherein the drive means further includes a first clutch mounted to the machine and connectable via a circuit to the control means, the clutch being energized when the machine is operated so that upon receipt of an input signal identifying a stone-like object by the control means the circuit is broken and the drive to the conveying means is disengaged.

27. The harvesting and threshing machine according to claim 26 wherein the drive means further comprises a second clutch cooperable with the solenoid so that upon receipt of the output signal the solenoid causes the second clutch to be engaged, placing the drive means in the first non-driving position while permitting the rattle clutch to dissipate inertial drive of the conveying means.

28. In a harvesting and threshing machine with a power source to power the moving components thereof, having in combination
(a) a mobile frame;
(b) threshing apparatus mounted to the frame;
(c) an infeed housing mounted to the frame adjacent the threshing apparatus and in material flow communication therewith, said infeed housing having an outlet end positioned adjacent said threshing apparatus, an inlet end spaced from said outlet end and a shell forming a passageway therethrough for the flow of crop material from said inlet end to said outlet end;
(d) conveying means movably mounted within the infeed housing and effective to convey crop material received by the infeed housing at said inlet end through said passageway to the threshing apparatus adjacent said outlet end, a drive mechanism being mounted on said infeed housing to operatively drive said conveying means;
(e) stone sensing means cooperative with the infeed housing and the conveying means to detect the presence of stone-like objects within the flow of crop material entering said inlet end; and
(f) control means connectable to the drive for the conveying means and cooperative with the stone sensing means such that upon detection of a stone-like object by the stone sensing means the control means is effective to instantaneously shock stop the drive to the conveying means, the improvement comprising:

(g) a rattle clutch cooperatively associated with the control means and the drive for the conveying means and effective upon activation of the stone sensing means to permit the conveying means with its inertial movement to run down before any detected stone-like object can be conveyed with the crop material to the threshing apparatus, yet without causing damage to the infeed housing, said rattle clutch having a drive portion connected to the drive for the conveying means and shock stoppable therewith by the control means and a driven portion engageable with the drive portion and connected to a shaft for rotative movement with the corresponding movement of the conveying means, the drive for the conveying means transferring operative power from the power source through the rattle clutch for the movement of said conveying means to convey crop material when the drive portion and the driven portion are operatively engaged, the driven portion being biased toward engagement with the drive portion by a spring biasing mechanism, the rattle clutch being operable to dissipate the inertial energy of the moving conveying means, when the drive portion is shock stopped by the control means, by the driven portion yieldingly slidingly engaging the drive portion until the torque transmitted to the driven portion by the inertial drive of the conveying means is equal to the slip torque provided by the spring biasing mechanism, the driven portion converting the inertial energy of the conveying means to dispersible heat energy through the sliding engagement with the drive portion.

* * * * *